United States Patent
Yamaguchi

[11] 3,812,576
[45] May 28, 1974

[54] METHOD OF MAKING COMMUTATOR FOR REVOLVING ARMATURE

[75] Inventor: Terumoto Yamaguchi, Anjo, Japan

[73] Assignee: Nippondenso Co., Ltd., Kariya-shi Aichi-ken, Japan

[22] Filed: Oct. 11, 1972

[21] Appl. No.: 299,609

[30] Foreign Application Priority Data
Oct. 25, 1971 Japan.............................. 46-84604

[52] U.S. Cl................. 29/597, 29/630 C, 310/235, 310/237
[51] Int. Cl............................................ H01r 43/00
[58] Field of Search........... 29/597, 630 C; 310/233, 310/234, 235, 237

[56] References Cited
UNITED STATES PATENTS

| | | | |
|---|---|---|---|
| 1,432,038 | 10/1922 | Russell | 310/237 X |
| 2,400,590 | 5/1946 | Meyerhoefer | 29/597 |
| 2,421,845 | 6/1947 | Moeller | 29/597 X |
| 3,566,460 | 3/1971 | Yamaguchi | 29/597 |
| 3,705,997 | 12/1972 | Bauerle et al. | 310/237 |

Primary Examiner—Charles W. Lanham
Assistant Examiner—Carl E. Hall
Attorney, Agent, or Firm—Cushman, Darby & Cushman

[57] ABSTRACT

A method of making a commutator for a revolving armature which has a surface to be in contact with a brush is perpendicular to the shaft of the armature is improved. Recessed portions are formed on the internal surface of a cylindrical member having an open end with an outwardly extending flange and a bottom. The recessed portions are removed after insulating material is filled in the cylindrical member. The cylindrical member made of conductive material is divided into commutator segments by grooves which extend through holes formed by removing the recessed portions after filling the insulating material.

5 Claims, 17 Drawing Figures

METHOD OF MAKING COMMUTATOR FOR REVOLVING ARMATURE

BACKGROUND OF THE INVENTION

1. FIELD OF THE INVENTION

This invention relates to a method of making a commutator for a revolving armature, and more particularly to a method of making a face commutator for a revolving armature in which the surface of commutator segments to be in contact with the brush is perpendicular to the axis of revolution of the revolving armature.

2. DESCRIPTION OF THE PRIOR ART

There are two types of commutators of this kind one of which has connection risers on the outer periphery thereof and the other of which has connection grooves on the outer periphery thereof. In the method of making the former type of commutators having connection risers on the periphery thereof, an annular copper plate member is used for making a commutator segment. The annular copper plate member is punched and bent to form a desired shape of face commutator conductive member having engagement hooks on the inner and outer peripheries thereof and connection risers on the outer periphery thereof. This conductive commutator member in molded together with insulating phenol resin which contains asbestos and thereafter radial grooves are provided thereon to divide the conductive member into desired number of commutator segments. After the conductive member is attached to a revolving armature, the surface to be in contact with a brush is abraded to form a good surface condition making no vibration when revolved. Normally, in order to facilitate the work for providing the radial grooves on the surface of the conductive member molded in the phenol resin the outer periphery of the conductive member is provided with punch holes in advance.

However, the conventional method as described above is disadvantageous in that the insulating material is liable to be attached to the connection risers by flowing out of the punched holes when the face commutator conductive member having the punched holes is molded in said insulating material. Further, it is very difficult to remove the insulating material attached to the connection risers, which not only is unfavorable from the viewpoint of production efficiency, but also brings about a problem that it is impossible to obtain constantly a face commutator of high quality.

SUMMARY OF THE INVENTION

The primary object of the present invention is to provide a method of making a face commutator for a revolving armature which has a great efficiency in production.

Another object of the present invention is to provide a method of making a face commutator for a revolving armature of considerably high quality.

In order to accomplish the above objects of the invention, the method in accordance with the present invention first makes a cylindrical member having an open end and a bottom with a flange formed at the open end thereof and forms radially recessed portions on the internal surface thereof for processing radial grooves which divide the cylindrical member into commutator segments, and forms engagement hooks on the internal surface of the cylindrical member at positions corresponding to said commutator segments. Further, in the method in accordance with the present invention, an insulating material is inserted into said cylindrical member and then said flange is punched to form connection risers and said recessed portions are removed to form holes, and commutator segments are formed by dividing the cylindrical member by radial grooves extending through said holes.

Other objects, features and advantages will be made apparent from the following description of the preferred embodiments of the present invention taken in conjunction with the accompanying drawings as follows.

BRIEF DESCRIPTION OF THE DRAWING

FIGS. 3 to 16 are views for explanation of the first embodiment of the present invention, in which FIG. 3 is a front view of a cylindrical member made from a disc shaped element, FIG. 4 is a top view of the cylindrical member after it is processed to form recessed portions on the internal surface thereof for forming holes used to provide radial grooves which divide the cylindrical member into commutator segments, FIG. 5 is a cross sectional view taken along the line V—V of FIG. 4, FIG. 6 is an enlarged partial sectional view taken along the line VI—VI of FIG. 5, FIG. 7 is an enlarged sectional view showing a part indicated at VII in FIG. 5, FIG. 8 is a top view showing the cylindrical member shown in FIG. 4 after it is processed to form engagement hooks on the internal surface thereof at positions corresponding to the commutator segments, FIG. 9 is a cross sectional view taken along the line IX—IX of FIG. 8, FIG. 10 is a top view showing the cylindrical member after an insulating material is inserted therein, FIG. 11 is a cross sectional view taken along the line XI—XI of FIG. 10, FIG. 12 is a top view showing the cylindrical member after connection risers are formed by punching and the recessed portions are removed, FIG. 13 is a cross sectional view taken along the line XIII—XIII of FIG. 12, FIG. 14 is a top view of the residual member punched out when the connection risers are formed and the recessed portions are removed by punching, FIG. 15 is a cross sectional view taken along the line XV—XV of FIG. 14, and FIG. 16 is a perspective view of the face commutator completed in accordance with the first embodiment of the present invention.

DESCRIPTION OF THE PREFERRED EMBODIMENTS

Figure 3:
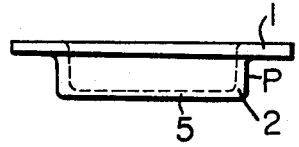
Figure 4:
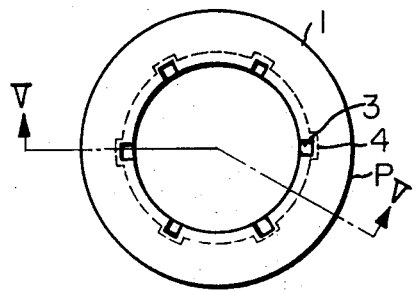
Figure 5:
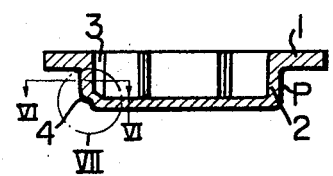
Figure 6:
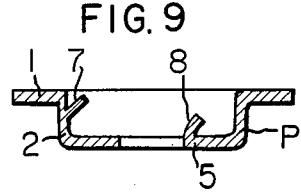
Figure 7:
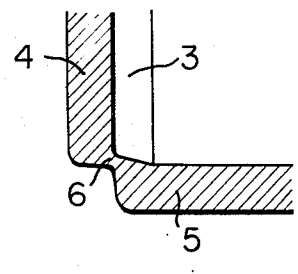
Figure 8:
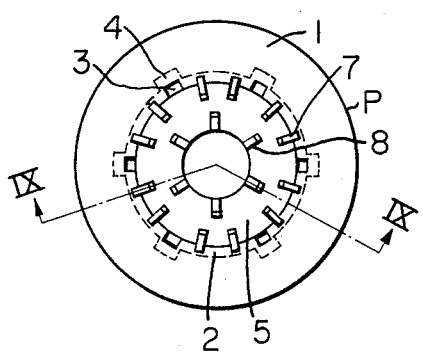
Figure 9:
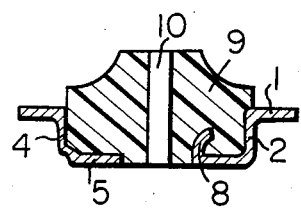
Figure 10:
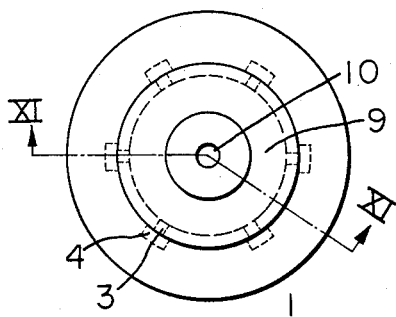
Figure 11:
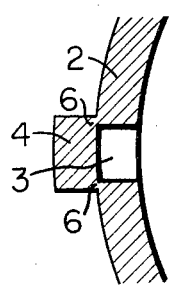

Referring to FIG. 3, a cylindrical member P having an open end with a flange 1 and a bottom 5 is first made by disc shaped conductive material such as a copper plate. The cylindrical member P is provided with recessed portions 4 for forming holes 3 to process grooves to divide it into commutator segments as shown in FIGS. 4 and 5. The recessed portions 4 are formed by pressing from the interior of the cylindrical portion 2 of the cylindrical member P. The thickness of the portions 6 connecting the recessed portions 4 with the cylindrical portion 2 and the bottom 5 is made small to such an extent that the connecting portions 6 may not be broken when the insulating material hereinafter mentioned is inserted thereinto as shown in FIGS. 6 and 7. Thereafter, the cylindrical member P is provided on the internal surface thereof with engagement hooks 7 peeled up from the cylindrical portion 2 and provided on the bottom 5 thereof with engagement hooks 8 punched and bent from the bottom 5 as shown in FIGS. 8 and 9. An insulating material 9 such as phenol resin containing asbestos is inserted into the face commutator conductive member made as described above as shown in FIGS. 10 and 11. The reference numeral 10 shows a hole to be engaged with the shaft of the armature. At this time, said insulating material 9 is filled in the recessed portions 4 or holes 3. However, the insulating material 9 never happens to be attached to the flange 1 or the outer surface of the bottom 5 by flowing or leaking out of the holes 3 owing to the presence of the recessed portions 4. On the other hand, the engagement hooks 7 and 8 are completely buried in the insulating material 9.

Figure 12:
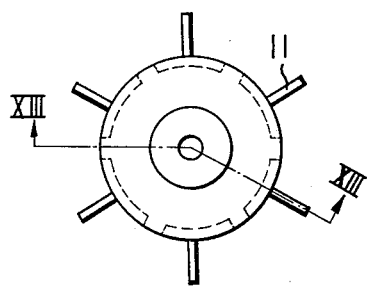
Figure 13:
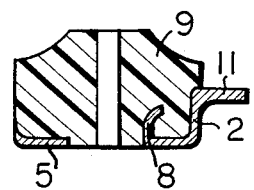
Figure 14:
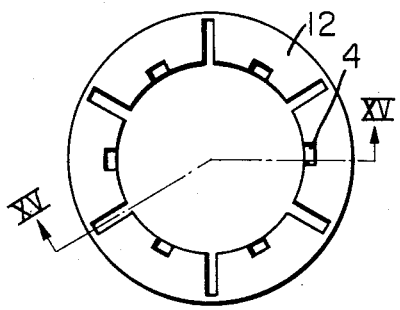
Figure 15:
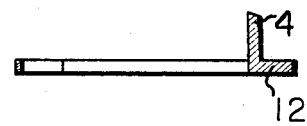

Thereafter, the flange portion 1 of the face commutator conductive member is punched to form connection risers 11 and to remove said recessed portions 4 to form holes as shown in FIGS. 12 and 13. Since the recessed portions 4 are connected with the cylindrical portion 2 and the bottom 5 through thin portions 6, the recessed portions 4 and the punched away portion 12 of the flange 1 can be removed together as shown in FIGS. 14 and 15.

Figure 1:
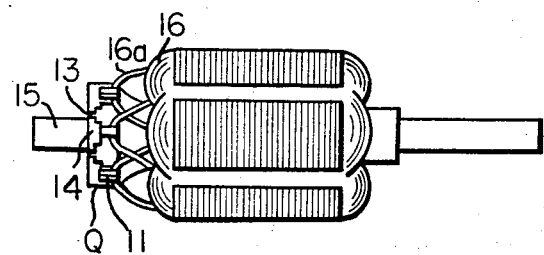
FIG. 1 is a side view of a revolving armature provided with the face commutator made in accordance with the method of the present invention.
Figure 2:
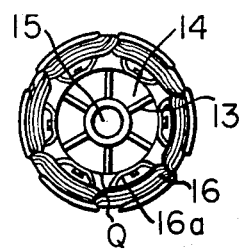
FIG. 2 is a front view of the revolving armature shown in FIG. 1.
Figure 16:
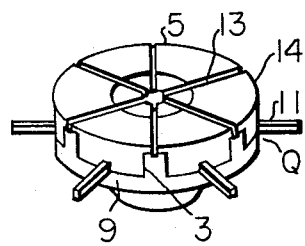

Then, as shown in FIG. 16, radial dividing grooves 13 are provided on the bottom 5 of the cylindrical member through the holes 3 so that the bottom 5 may be divided into several commutator segments 14 to form a face commutator Q. The face commutator Q thus made is mounted to the shaft 15 of a revolving armature as shown in FIGS. 1 and 2 and the end surface of the commutator Q to be in contact with a brush is abraded to make a smooth and flat surface making no vibration when rotated. In FIGS. 1 and 2, the reference numeral 16 indicates an armature coil and 16a indicates a leading wire thereof.

Figure 17:
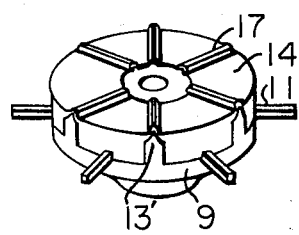
FIG. 17 is a perspective view of the face commutator made in accordance with the second embodiment of the present invention.

The dividing grooves 13 may be formed by removing bridge portions 17 which have been provided in advance before the insulating material 9 is inserted into the cylindrical member at the positions where the dividing grooves are to be formed when the surface of the end surface of the conductive member is abraded as mentioned above, as shown in FIG. 17. Thus, the process for making the dividing grooves 13 can be eliminated and the efficiency of production is improved. Further, the cylindrical member P may be in the form which has an opening at the central portion thereof since the central portion thereof is finally punched away to form engagement hooks 8. If the cylindrical member P is made with a central opening, the member can be made from a cylindrical element instead of the disc shaped copper element used in the aforesaid embodiment.

Further, although in the foregoing embodiment the formation of the connection risers 11 in the flange 1 has been explained to be carried out at the same time when the recessed portions 4 are removed, the connection risers 11 may be formed by punching the flange 1 in the state as shown in FIG. 3 or 4 and the recessed portions 4 may be removed after the formation of the connection risers 11. Alternately, the recessed portions 4 may be provided on the wall of the cylindrical member P after the connection risers 11 are formed by punching.

I claim:

1. A method of making a face commutator for a revolving armature comprising the steps of
    a. forming a plurality of recessed portions on the internal wall of a cylindrical member having an open end with an outwardly extending flange and a bottom, said recessed portions extending down the internal wall of the cylindrical member to define commutator segments along the internal wall between adjacent ones of the recessed portions,
    b. forming engagement hooks on the internal surface of said cylindrical member at positions corresponding to the commutator segments,
    c. punching said flange to form connection risers at positions between said recessed portions,
    d. putting an insulating material into said cylindrical member at least after said recessed portion forming step and said engagement hooks forming step, said insulating material having portions extending into said recessed portions,
    e. removing said recessed portions of the internal wall of the cylindrical member after said insulating material putting step to expose the insulating material portions which extended into the recessed portions and which divide the wall of the cylindrical member into commutator segments, and
    f. forming radial dividing grooves across the bottom of the cylindrical member extending between the insulating material exposed portions to form a plurality of divided coplanar commutator segments.

2. Method of making a face commutator for a revolving armature as defined in claim 1 wherein said cylindrical member having an open end with an outwardly extending flange and a bottom is made by pressing a metal plate.

3. Method of making a face commutator for a revolving armature as defined in claim 1 wherein said bottom has an opening at the central portion thereof.

4. Method of making a commutator for a revolving armature as defined in claim 3 wherein said cylindrical member having an open end with an outwardly extending flange and a bottom having an opening at the central portion thereof is made by pressing a metal cylindrical element.

5. Method of making a commutator for a revolving armature as defined in claim 1 further comprising the step of forming radial bridge portions on the bottom of said cylindrical member after said recessed portion forming step.

* * * * *